United States Patent [19]

Imai

[11] Patent Number: 5,726,700

[45] Date of Patent: Mar. 10, 1998

[54] THERMAL RECORDING DEVICE

[75] Inventor: Shinji Imai, Kanagawa-ken, Japan

[73] Assignee: Fuji Photo Film Co., Ltd., Kanagawa, Japan

[21] Appl. No.: 625,343

[22] Filed: Apr. 1, 1996

[30] Foreign Application Priority Data

Mar. 31, 1995 [JP] Japan .................................. 7-074984

[51] Int. Cl.⁶ .............................. B41J 2/435; G01D 15/24
[52] U.S. Cl. ............................ 347/263; 347/133; 347/245
[58] Field of Search ........................... 347/131, 133, 347/134, 138, 187, 139, 263, 264, 262, 256, 242, 245, 241

[56] References Cited

U.S. PATENT DOCUMENTS 5,550,571  8/1996  Shoji ........................................ 347/133
5,557,303  9/1996  Agano et al. ............................ 347/187

Primary Examiner—Mark J. Reinhart
Attorney, Agent, or Firm—Sughrue, Mion, Zinn, Macpeak & Seas, PLLC

[57] ABSTRACT

A thermal recording device records information on a heat-sensitive recording material which develops color in a density according to heat energy supplied thereto. The thermal recording device pre-heats the heat-sensitive recording material with heat energy less than energy necessary to develop color in the heat-sensitive recording material and scans the recording material with a laser beam modulated according to the information to be recorded. A region from the upper surface of the heat-sensitive recording material to a space above the upper surface of the heat-sensitive recording material through which the laser beam impinges upon the heat-sensitive recording material is isolated from the surrounding space at least at its sides and top by side isolating members and a top isolating member, and at least the top isolating member is transparent so that the laser beam impinges upon the heat-sensitive recording material through the top isolating member.

4 Claims, 3 Drawing Sheets

THERMAL RECORDING DEVICE

BACKGROUND OF THE INVENTION

1. Field of the Invention

This invention relates to a thermal recording device for recording an image or the like on a heat-sensitive recording medium with the recording medium pre-heated.

2. Description of the Related Art

There has been put into wide use a thermal recording device which records an image or the like on a heat-sensitive recording medium by applying heat energy to the recording medium. Recently there has been developed a thermal recording device in which a laser is employed as a heat source, thereby making it feasible to effect high speed recording. See, for instance, Japanese Unexamined Patent Publication Nos. 50(1975)-23617, 58(1983)-94494, 62(1987)-77983 and 62(1987)-78964.

We have disclosed a heat-sensitive recording material which is used in such a thermal recording device and on which a high quality image can be recorded. See Japanese Unexamined Patent Publication Nos. 5(1993)-301447 and 5(1993)-24219.

The heat-sensitive recording material comprises a color forming agent, a developing agent and a light absorbing dyestuff (photo-thermo conversion agent) provided on a support film and forms a color in a density according to the heat energy applied.

The heat-sensitive material has a heat sensitive layer formed by applying, to a support film, coating liquid containing therein emulsion obtained by dissolving microcapsules containing at least a basic dye precursor, a developing agent and a light absorbing dyestuff in organic solvent which is insoluble or slightly soluble in water and then emulsifying the solution.

As the basic dye precursor, is employed a compound which is generally substantially colorless, is colored by donating electrons or accepting protons of acid or the like and has a partial framework of lactone, lactam, sultone, spiro-pyran, ester, amide or the like and in which ring opening or cleavage of the partial framework occurs upon contact with a developing agent. For example, crystal violet lactone, benzoyl leuco methylene blue, malachite green lactone, rhodamine B lactam, 1,3,3-trimethyl-6'- ethyl-8'-butoxyindolinonebenzospiropyran and the like can be used.

As the the developing agent for these color forming agents, acidic compounds such as phenol compounds, organic acids, metal salts of organic acids, oxybenzoate esters or the like are employed. As the a developing agent, those having a melting point in the range of 50° to 250° C. are preferred, and phenols or organic acids which are slightly soluble in water and have a melting point in the range of 60° to 200° C. are especially preferred. The examples of the the developing agent are disclosed, for instance, in Japanese Unexamined Patent Publication No. 61(1986)-291183.

As the light absorbing dyestuff, those having a low light absorption coefficient to visible light and an especially high light absorption coefficient to wavelengths in the infrared region are preferred. For example, cyanine dyestuffs, phthalocyanine dyestuffs, pyrylium-thiopyrylium dyestuffs, azulenium dyestuffs, squarylium dyestuffs, metal complex dyestuffs such as of Ni or Cr, naphthoquinone and anthraquinone dyestuffs, indophenol dyestuffs, indoanyline dyestuffs, triphenylmethane dyestuffs, triarylmethane dyestuffs, aminium and diimmonium dyestuffs and nitroso compounds can be used. Among these compounds, those having a high absorption coefficient to light in near infrared region having wavelengths of 700 to 900 nm are especially preferred in view of the fact that semiconductor lasers oscillating near infrared rays have been put into practice.

Such heat-sensitive recording material is arranged not to be colored at a low energy level in order to ensure good shelf stability. Accordingly in order to obtain a desired color development, a substantial heat energy is necessary. This gives rise to a problem that the dynamic range is narrowed by an amount corresponding to the threshold heat energy necessary to color the recording material and it becomes difficult to obtain a high gradation image. Further load on the recording system required to color the recording material becomes substantial.

Accordingly this applicant has proposed a thermal recording device which can record a high gradation image with a high accuracy without necessity of high output by pre-heating the aforesaid heat-sensitive recording material to a temperature just below the color developing temperature by use of a heat roll or the like and projecting onto the recording material a laser beam modulated according to information to be recorded. See Japanese Unexamined Patent Publication No. 6(1994)-198924.

However when the recording material is pre-heated, air above the recording site is heated and convection of air is generated, whereby fluctuation in the refractive index of air is generated, that is, the refractive index of air comes to vary by position. Such fluctuation in the refractive index of air causes nonuniformity in the scanning lines of the laser beam on the recording material or fluctuation in the point on which the laser beam is focused, whereby the image recorded on the recording material can be distorted or blurred.

SUMMARY OF THE INVENTION

In view of the foregoing observations and description, the primary object of the present invention is to provide a thermal recording device which can prevent distortion and/or blur in the recorded image due to convection of air and can record a high gradation image with a high accuracy with a sufficient dynamic range of a recording laser beam.

In a thermal recording device which records information on a heat-sensitive recording material which develops color in a density according to heat energy supplied thereto by pre-heating the heat-sensitive recording material with heat energy less than energy necessary to develop color in the heat-sensitive recording material and scanning the recording material with a laser beam modulated according to the information to be recorded to supply predetermined heat energy to the heat-sensitive recording material, the thermal recording device in accordance with the present invention is characterized in that a region from the upper surface of the heat-sensitive recording material to a space above the upper surface of the heat-sensitive recording material through which the laser beam impinges upon the heat-sensitive recording material is isolated from the surrounding space at least at its sides and top by side isolating members and a top isolating member, and at least the top isolating member is transparent so that the laser beam impinges upon the heat-sensitive recording material through the top isolating member.

With this arrangement, the isolating members prevent generation of convection of air in the region through which the laser beam impinges upon the surface of the heat-sensitive recording material. Accordingly the laser beam can uniformly scan the heat-sensitive recording material in a precisely focused state without affected by flicker of air, whereby a high gradation image can be recorded with a high accuracy.

DESCRIPTION OF THE PREFERRED EMBODIMENT

Figure 1:
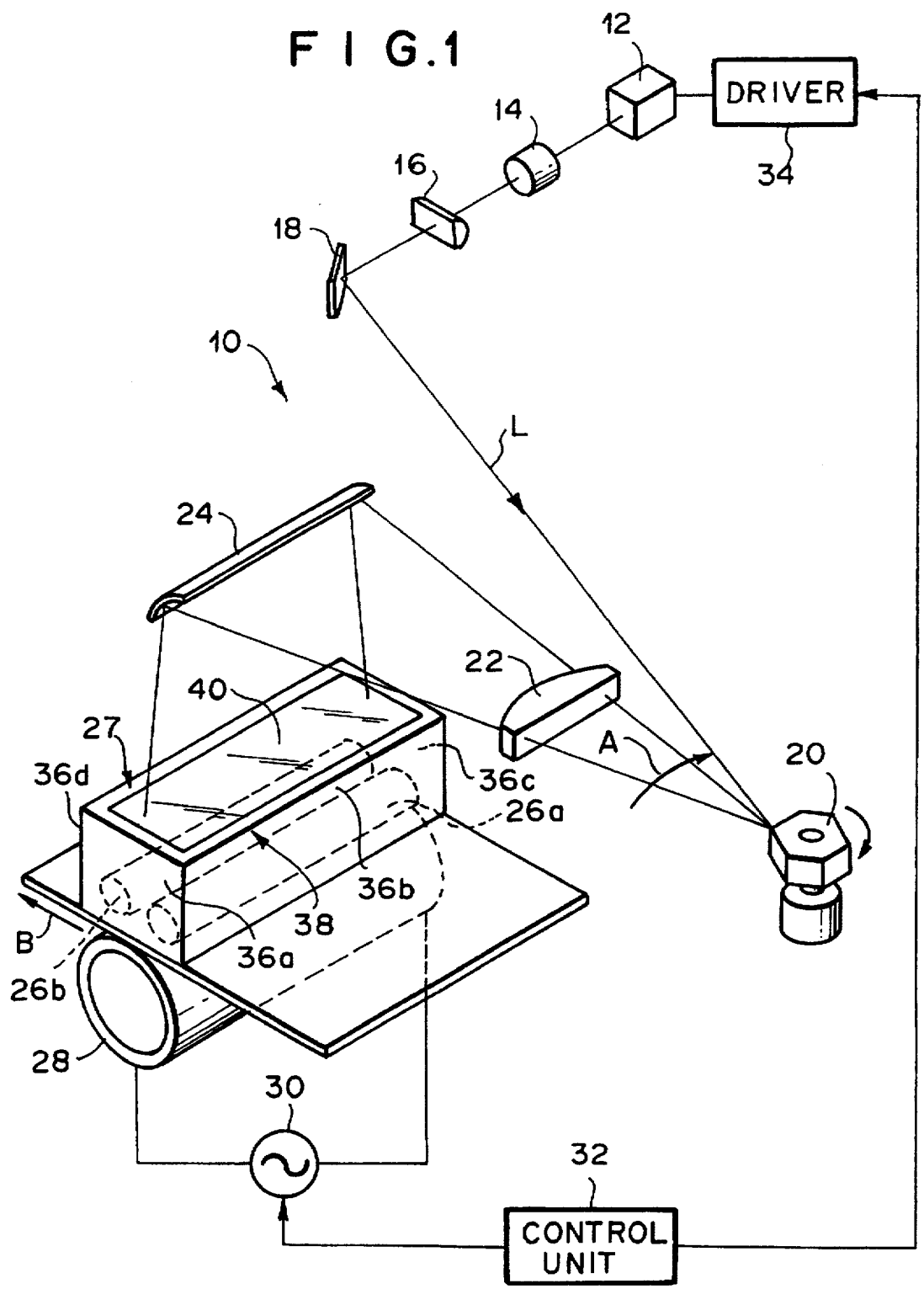
FIG. 1 is a schematic perspective view of a thermal recording device in accordance with an embodiment of the present invention.

In FIG. 1, a thermal recording device 10 in accordance with an embodiment of the present invention is for recording an image on a heat-sensitive recording material S by scanning the heat-sensitive recording material S with a laser beam L in the direction of arrow A (main scanning) while conveying the heat-sensitive recording material S in the direction of arrow B (sub-scanning). The thermal recording device 10 comprises a laser diode 12 which outputs a laser beam L, a collimator lens 14 which collimates the laser beam L, a cylindrical lens 16, a reflecting mirror 18, a polygonal mirror 20 which deflects the laser beam L, an fθ lens 22, a cylindrical mirror 24 which is associated with the cylindrical lens 16 to compensate for surface tilt in deflecting surfaces of the polygonal mirror 20, a nip rolls 26a and 26b adapted to abut against the upper surface of the heat-sensitive recording material S, an isolating member 27 which is disposed between the cylindrical mirror 24 and the nip rolls 26a and 26b, a heat roll 28 adapted to abut against the lower surface of the heat-sensitive recording material S between the nip rolls 26a and 26b, and a power source 30 which energizes the heat roll 28. The power source 30 is controlled by a control unit 32 and the laser diode 12 is controlled by the control unit 32 by way of a driver 34.

Figure 2:
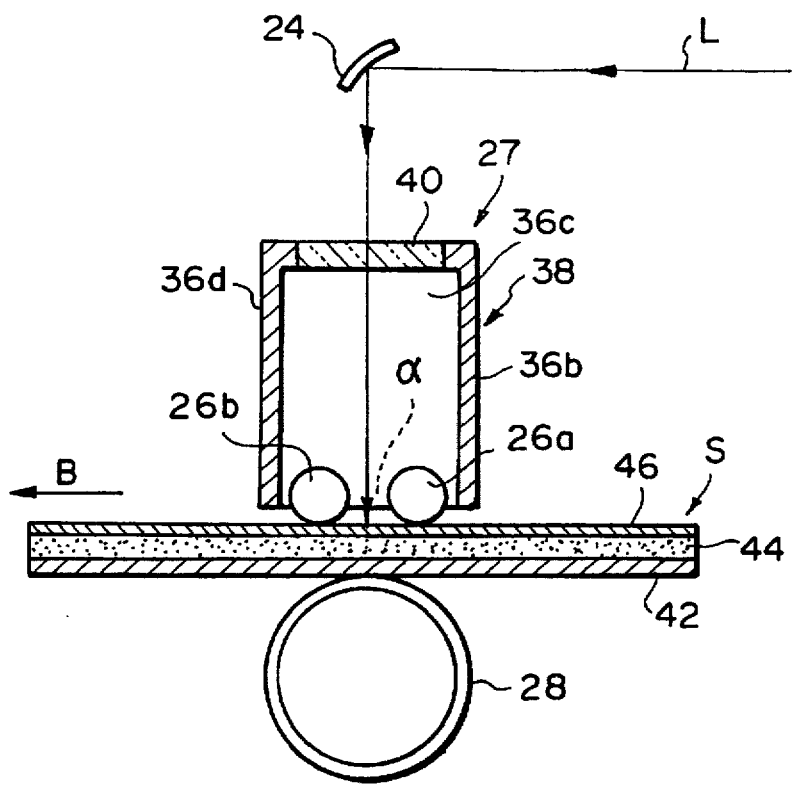
FIG. 2 is a view for illustrating the heat-sensitive recording material and an isolating member employed in the thermal recording device shown in FIG. 1.

As shown in FIG. 2, the isolating member 27 comprises a tubular body 38 formed by four side walls 36a to 36d and a transparent glass plate 40 which closes the upper end of the tubular body 38 and is open downward. The isolating member 27 isolates a space above the nip rolls 26a and 26b from the surrounding space. It is preferred that the glass plate 40 be coated with antireflection coating in order to increase the light transmission rate of the glass plate 40.

The heat-sensitive recording material S comprises a heat-sensitive layer 44 which contains therein a color forming agent, a developing agent and a light absorbing dyestuff (photo-thermo conversion agent) and is formed on a support film 42 and a protective layer 46 formed on the heat-sensitive layer 44. As the materials of the heat-sensitive layer 44, those disclosed, for instance, in Japanese Unexamined Patent Publication Nos. 5(1993)-301447 and 5(1993)-24219 may be employed.

Figure 3:
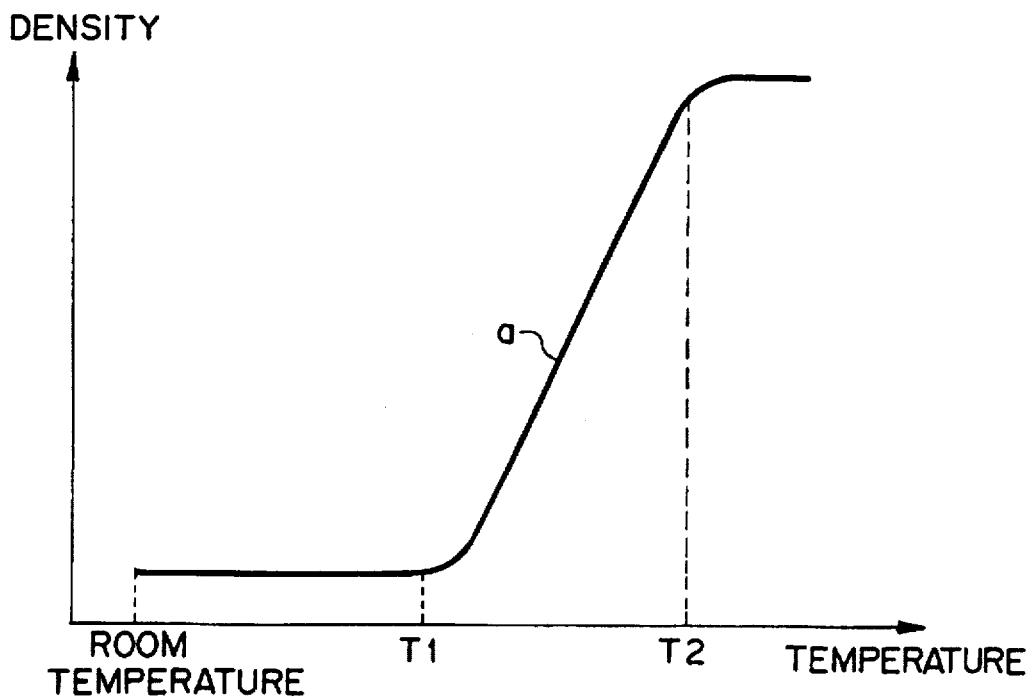
FIG. 3 is a view for illustrating the color developing characteristics of the heat-sensitive recording material.

The control unit 32 actuates the power source 30 to energize the heat roll 28 and pre-heats the heat-sensitive recording material S nipped between the heat roll 28 and the nip rolls 26a and 26b while conveying the heat-sensitive recording material S in the direction of arrow B (sub-scanning). That is, a predetermined electric current is supplied to the heat roll 28 from the power source 30 and a part of the heat-sensitive recording material S between the nip rolls 26a and 26b where the laser beam L scans the material S for recording is heated to a temperature just below a color developing temperature. The curve a in FIG. 3 shows the relation between the temperature of the heat-sensitive recording material S and the density of color developed. The heat-sensitive recording material S is pre-heated to a temperature T1 just below a temperature at which color begins to be developed.

Since the temperature of the heat-sensitive recording material S between the nip rolls 26a and 26b is elevated, the temperature of air in region α (FIG. 2) between the nip rolls 26a and 26b is higher than that of air in the surrounding space and the air in the region α tends to move upward by convection. For a certain time interval after start of heating the heat roll 28, the air in the region α moves upward in the isolating member 27 forcing downward air in the isolating member 27 at the room temperature. However a predetermined time after start of heating the heat roll 28, the space above the region α isolated from the surrounding space by the isolating member 27 or the space in the isolating member 27 is filled with heated air and convection of air is suppressed or almost suppressed, whereby unevenness in density of air in the region α and the space above the region α does not arises.

With the heat-sensitive recording material S pre-heated by the heat roll 28, the control unit 32 drives the laser diode 12 by way of the driver 34. The laser diode 12 outputs a laser beam L modulated according to the gradation of an image to be recorded on the heat-sensitive recording material S. The laser beam L is collimated by the collimator lens 14 and impinges upon the polygonal mirror 20 through the cylindrical lens 16 and the reflecting mirror 18. The polygonal mirror 20 is rotating at a high speed and the laser beam L is deflected by the polygonal mirror 20 to impinge upon the heat-sensitive recording material S between the nip rolls 26a and 26b through the fθ lens 22, the cylindrical mirror 24 and the glass plate 40 of the isolating member 27, thereby scanning the heat-sensitive recording material S in the direction of arrow A (main scanning).

Since flicker of air in the optical path of the laser beam L between the cylindrical mirror 24 and the heat-sensitive recording material S is suppressed by the isolating member 27, the laser beam L can uniformly scan the heat-sensitive recording material S in a precisely focused state without affected by flicker of air. As a result, heat energy of a predetermined level is applied to the heat-sensitive layer 44 of the heat-sensitive recording material S by the laser beam L, whereby a high gradation image can be recorded with a high accuracy.

Further since the heat-sensitive recording material S has been pre-heated to the temperature T1 (FIG. 3) by the heat roll 28, the laser diode 12 need not be controlled in a wide temperature range between the room temperature of the place where the thermal recording device 10 is installed and the temperature T2 shown in FIG. 3. That is, the laser diode 12 is controlled in the temperature range between the temperatures T1 and T2 and a high gradation image can be recorded with a high accuracy. Further since the laser diode 12 need not output high power, the thermal recording device 10 can be simplified in structure and can be manufactured at low cost. It is preferred that the temperature T1 be set between 40° C. to 275° C. according to the color developing properties of the heat-sensitive recording material S and the pre-heating time be set not longer than 30 seconds in view of the throughput. More preferably the temperature T is set between 70° C. to 250° C. since the glass transition temperature of the microcupusles is 70° C. to 250° C. Further since fogging tends to be less as the pre-heating time is shorter, it is preferred that the pre-heating time be not longer than 10 seconds.

Figure 4:
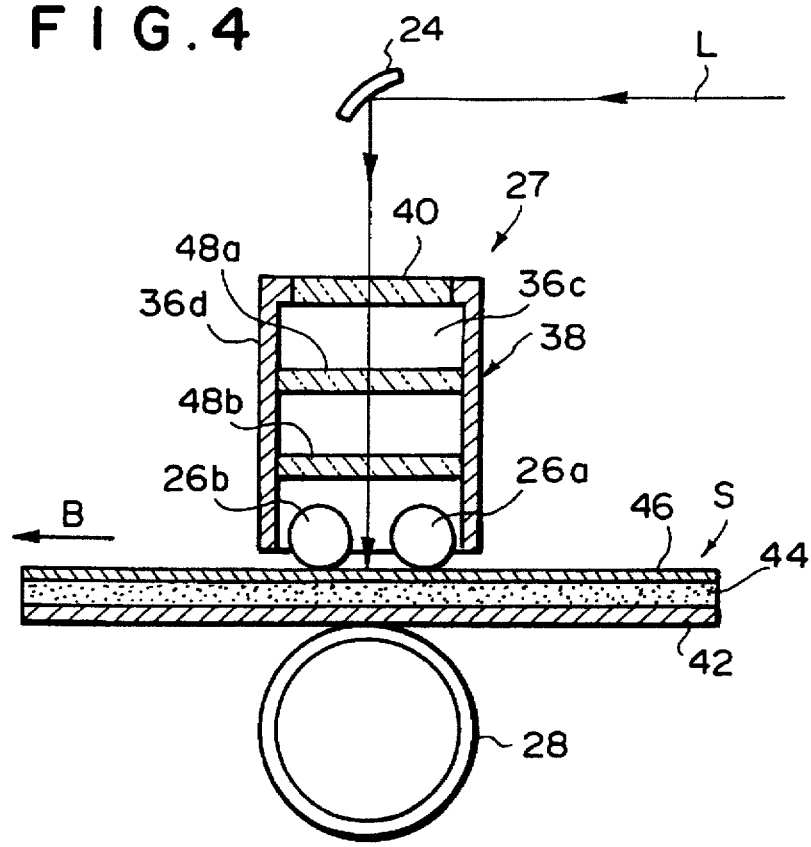
FIG. 4 is a view for illustrating a modification of the isolating member.

In the modification of the isolating member 27 shown in FIG. 4, the inside space is divided into three by glass plates 48a and 48b. In this modification, since the volume of the space in which convection of air can be generated is small, flicker of air can be better suppressed than in the isolating member 27 shown in FIGS. 1 and 2, whereby image recording can be effected more accurately.

Figure 5:
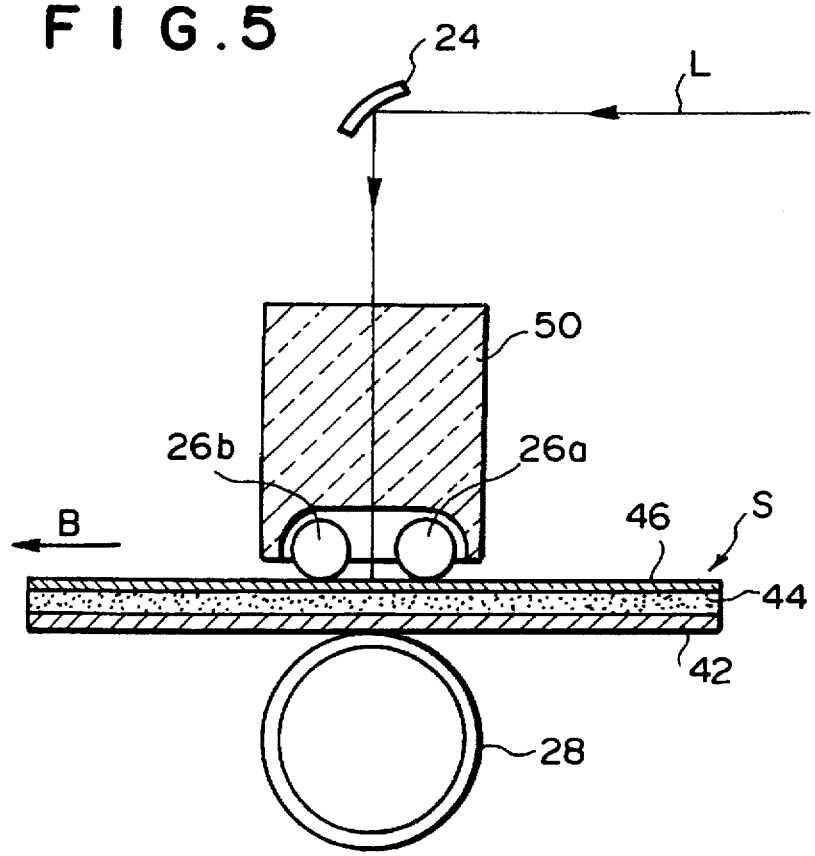
FIG. 5 is a view for illustrating another modification of the isolating member.

In the modification of the isolating member 27 shown in FIG. 5, a transparent block 50 of glass, acrylic resin or the like is used. Since convection of air is never generated in the block 50, image recording can be effected further more accurately so long as the light transmissivity of the block 50 is sufficiently high.

As can be understood from the description above, in the thermal recording device in accordance with the present invention, the isolating members prevent generation of convection of air in the region through which the laser beam impinges upon the surface of the heat-sensitive recording material even if the heat-sensitive recording material is pre-heated. Accordingly the laser beam can uniformly scan the heat-sensitive recording material in a precisely focused state without affected by flicker of air, whereby a high gradation image can be recorded with a high accuracy. Further since the heat-sensitive recording material has been pre-heated to a temperature just below the color developing temperature, the laser diode can be controlled in a reasonable temperature range and a high gradation image can be recorded with a high accuracy.

What is claimed is:

1. A thermal recording device which records information on a heat-sensitive recording material which develops color in a density according to heat energy supplied thereto by pre-heating the heat-sensitive recording material with heat energy less than energy necessary to develop color in the heat-sensitive recording material and scanning the recording material with a laser beam modulated according to the information to be recorded to supply predetermined heat energy to the heat-sensitive recording material, wherein the improvement comprises that a region from the upper surface of the heat-sensitive recording material to a space above the upper surface of the heat-sensitive recording material through which the laser beam impinges upon the heat-sensitive recording material is isolated from the surrounding space at least at its sides and top by side isolating members and a top isolating member, and at least the top isolating member is transparent so that the laser beam impinges upon the heat-sensitive recording material through the top isolating member.

2. A thermal recording device as defined in claim 1 in which said heat-sensitive recording material comprises a colorforming agent, a developing agent and a photo-thermo conversion agent provided on a support film.

3. A thermal recording device as defined in claim 1 in which said top isolating member comprises a plurality of transparent plate members which are spaced from each other in the direction of the laser beam.

4. A thermal recording device as defined in claim 1 in which said isolating members are formed by a transparent solid body.

* * * * *